United States Patent
Choi et al.

(10) Patent No.: US 8,229,516 B2
(45) Date of Patent: Jul. 24, 2012

(54) SYSTEM AND METHOD FOR PROVIDING SWITCHING SERVICE BETWEEN TELEMATICS TERMINAL AND MOBILE TERMINAL

(75) Inventors: Jong-Hyuk Choi, Seoul (KR); Byung-Koo Ahn, Seoul (KR)

(73) Assignee: KT Corporation, Gyeonggi-do (KR)

( * ) Notice: Subject to any disclaimer, the term of this patent is extended or adjusted under 35 U.S.C. 154(b) by 434 days.

(21) Appl. No.: 12/600,619

(22) PCT Filed: May 16, 2008

(86) PCT No.: PCT/KR2008/002753
§ 371 (c)(1),
(2), (4) Date: Nov. 17, 2009

(87) PCT Pub. No.: WO2008/143438
PCT Pub. Date: Nov. 27, 2008

(65) Prior Publication Data
US 2010/0178915 A1   Jul. 15, 2010

(30) Foreign Application Priority Data
May 17, 2007  (KR) .......................... 10-2007-0048332
Jun. 25, 2007  (KR) .......................... 10-2007-0062402

(51) Int. Cl.
H04M 1/00 (2006.01)
H04M 3/42 (2006.01)
H04B 7/00 (2006.01)

(52) U.S. Cl. .................. 455/569.2; 455/417; 455/41.2; 455/415

(58) Field of Classification Search .............. 455/41.2, 455/415, 417, 569.1, 569.2
See application file for complete search history.

(56) References Cited

U.S. PATENT DOCUMENTS

| | | | |
|---|---|---|---|
| 6,965,787 B2 * | 11/2005 | Kindo et al. | 455/569.2 |
| 7,245,951 B2 * | 7/2007 | Oesterling et al. | 455/575.9 |
| 7,443,972 B1 * | 10/2008 | Barlow et al. | 379/212.01 |
| 7,471,929 B2 * | 12/2008 | Fujioka et al. | 455/73 |
| 7,873,392 B2 * | 1/2011 | Matsuda | 455/569.2 |
| 8,116,836 B2 * | 2/2012 | Ki | 455/575.9 |
| 2003/0032460 A1 * | 2/2003 | Cannon et al. | 455/569 |
| 2005/0018613 A1 | 1/2005 | Yokota | |
| 2005/0049021 A1 * | 3/2005 | Nedelcu et al. | 455/575.9 |
| 2005/0282579 A1 | 12/2005 | Kim | |
| 2006/0154659 A1 * | 7/2006 | Roter et al. | 455/422.1 |

(Continued)

FOREIGN PATENT DOCUMENTS
KR   10-2004-0010935 A   2/2004

(Continued)

Primary Examiner — Christopher M Brandt
(74) Attorney, Agent, or Firm — IP Legal Services, LLC

(57) ABSTRACT

The present invention relates to method and system for providing a terminal switching service between a telematics terminal and a mobile terminal, and the method according to the present invention comprises a switching step for receiving a terminal switching request from the telematics terminal mounted in a vehicle on a mobile communication network and providing the telematics terminal with a mobile communication service to be provided to the mobile terminal; a restoration request receiving step for receiving a terminal switching restoration request from the telematics terminal that sensed another passenger in the vehicle on the mobile communication network; and a restoring step for restoring information of each terminal to a state before terminal switching on the mobile communication network according to the restoration request.

8 Claims, 5 Drawing Sheets

U.S. PATENT DOCUMENTS

| | | | |
|---|---|---|---|
| 2007/0086579 A1* | 4/2007 | Lorello et al. | 379/45 |
| 2007/0238491 A1* | 10/2007 | He | 455/569.2 |
| 2008/0119240 A1* | 5/2008 | Ampunan et al. | 455/569.2 |
| 2009/0280870 A1* | 11/2009 | Muttschall et al. | 455/569.2 |

FOREIGN PATENT DOCUMENTS

| | | |
|---|---|---|
| KR | 10-2005-0023139 A | 3/2005 |
| KR | 10-2005-0090579 A | 9/2005 |
| KR | 10-2006-0099760 A | 9/2006 |

\* cited by examiner

FIG. 3

| SUBSCRIBER INFORMATION | TERMINAL INFORMATION | TERMINAL SWITCHING FLAG | LOCATION INFORMATION |
|---|---|---|---|
| 010-111-XXXX | TERMINAL 1 | 0 | RN1 |
| | | 1 | RN2 |
| 010-111-YYYY | TERMINAL 2 | 0 | RN3 |
| | | 1 | RN4 |
| ⋮ | | | |

SYSTEM AND METHOD FOR PROVIDING SWITCHING SERVICE BETWEEN TELEMATICS TERMINAL AND MOBILE TERMINAL

TECHNICAL FIELD

The present invention relates to a telematics service, and in particular, to system and method for providing a switching service between a telematics terminal and a mobile terminal.

BACKGROUND ART

Recently, a telematics service provides various multimedia functions, for example navigation that guides a driver and passengers to destination, burglar alarm, emergent rescue (SOS), remote diagnostics, expendables management, a hands-free mobile phone, living information, personal information, secretary service or Internet connection. In particular, a telematics terminal with a telematics service has an embedded mobile communication module, and thus the telematics terminal can provide mobile communication, and in the case that the telematics terminal is connected to an external mobile phone of a user, the telematics terminal can provide mobile communication hands-free.

However, in the same way that mobile terminals are incompatible with each other, a telematics terminal and a mobile terminal are utterly incompatible with each other. After a subscriber directly connects his/her mobile terminal to a telematics terminal by a cable, the subscriber can use mobile communication hands-free, however a profile of the mobile terminal is not automatically switched to the telematics terminal.

In other words, to prevent a car accident, when a subscriber gets in a vehicle, the subscriber should use a mobile phone service hands-free, however conventionally the subscriber connects a mobile terminal to a telematics terminal by a cable to use a mobile phone service hands-free. This causes inconvenience, and because a telematics terminal with a mobile phone function should be connected by a cable, favorable functions of the telematics terminal are not fully utilized. And, if a mobile terminal is connected to a telematics terminal, generally mobile communication is made through an external microphone and an external speaker. However, in the case that a passenger other than a driver is in a vehicle, a telephone conversation of the driver is exposed, which is undesirable in aspect of privacy protection of the driver.

DISCLOSURE

Technical Problem

The present invention is designed to solve the above-mentioned problems, and therefore it is an object of the present invention to provide terminal switching service providing method and system, which facilitates terminal switching between a telematics terminal and a mobile terminal, and in the case that another passenger gets in a vehicle, automatically switches from the telematics terminal to the mobile terminal to protect privacy of a subscriber, and a telematics terminal therefor.

And, these and other features, aspects, and advantages of the present invention will be more fully described in the preferred embodiments of the present invention. And, the objects and advantages of the present invention can be implemented by configurations recited in the claims singularly or in combination.

Technical Solution

In order to achieve the above-mentioned objects, a method for providing a switching service between a telematics terminal and a mobile terminal according to a first aspect of the present invention, comprises a switching step for receiving a terminal switching request from the telematics terminal mounted in a vehicle on a mobile communication network and providing the telematics terminal with a mobile communication service to be provided to the mobile terminal; a restoration request receiving step for receiving a terminal switching restoration request from the telematics terminal that sensed another passenger in the vehicle on the mobile communication network; and a restoring step for restoring information of each terminal to a state before terminal switching on the mobile communication network according to the restoration request.

According to a second aspect of the present invention, a system for providing a switching service between a telematics terminal and a mobile terminal, which releases terminal switching from the mobile terminal to the telematics terminal mounted in a vehicle on a mobile communication network, comprises a terminal switching service device for receiving a terminal switching release request from the telematics terminal that sensed another passenger in the vehicle; a first home location register for restoring an information of the mobile terminal by inactivating an information of the telematics terminal set as an information of the mobile terminal and activating the information of the mobile terminal, according to command of the terminal switching service device; a first switching device for receiving a mobile terminal activation command from the first home location register to release interception of a mobile communication service of the mobile terminal; and a second switching device for restoring a profile information of the mobile terminal set as a profile information of the telematics terminal to the profile information of the telematics terminal, with the telematics terminal being in a service area.

According to a third aspect of the present invention, a telematics terminal switched from/to a mobile terminal, comprises a mobile communication module for requesting terminal switching and terminal switching release between the mobile terminal and the telematics terminal to a terminal switching server; a sensor unit for sensing another passenger other than a driver; and a control unit for, when receiving another passenger recognition signal from the sensor unit, transmitting a terminal switching release command to the mobile terminal.

DESCRIPTION OF DRAWINGS

FIG. 3 is a view illustrating a table stored in a home location register according to an embodiment of the present invention.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
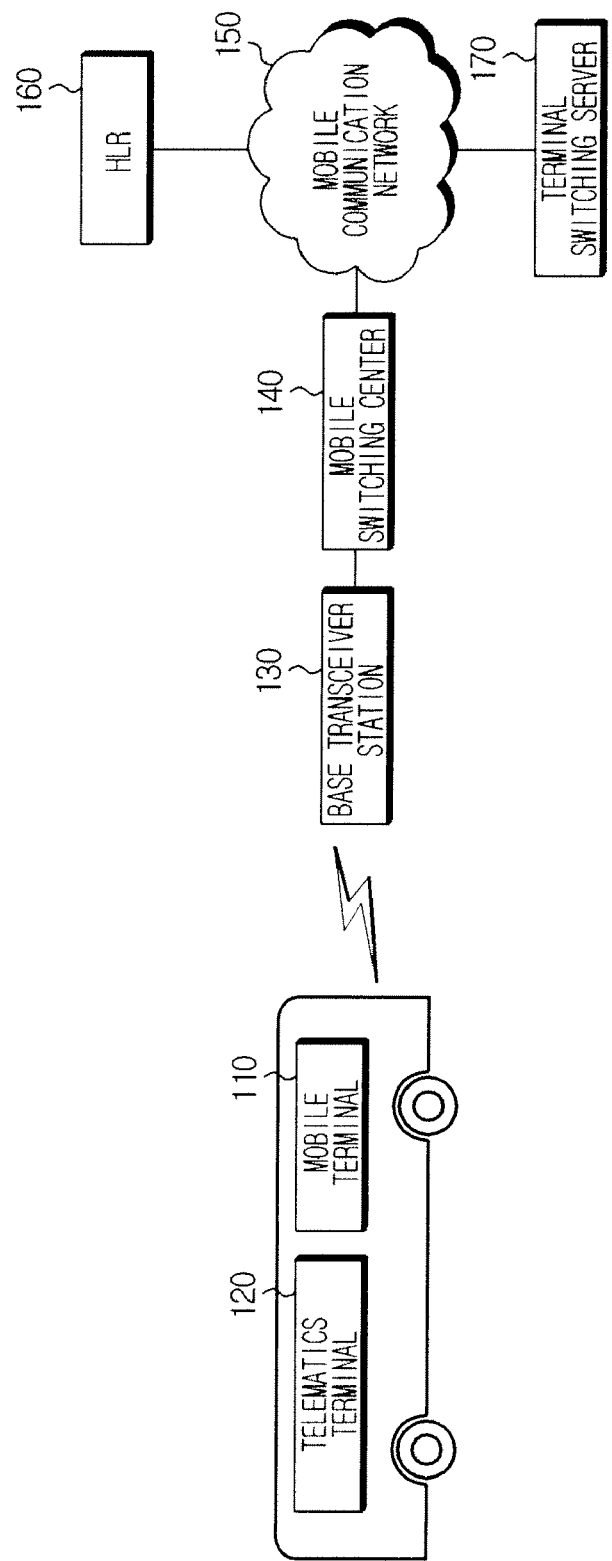
FIG. 1 is a view illustrating a network configuration of a system for providing a terminal switching service between a telematics terminal and a mobile terminal according to an embodiment of the present invention.

FIG. 1 is a view illustrating a network configuration of a system for providing a terminal switching service between a telematics terminal and a mobile terminal according to an embodiment of the present invention.

As shown in FIG. 1, the terminal switching service system according to the present invention comprises a mobile terminal 110, a telematics terminal 120, a base transceiver station 130, a mobile switching center 140, a mobile communication network 150, a home location register 160 and a terminal switching server 170.

When a subscriber gets in a vehicle and drives the vehicle, if the subscriber is provided with a mobile communication service by the mobile terminal 110, the likelihood of an accident is large, and thus when the subscriber gets in the vehicle, the subscriber may switch the mobile terminal 110 to the telematics terminal 120. That is, the subscriber can receive a call destined for the mobile terminal 110 using the telematics terminal 120 and communicate with other subscriber through an external speaker and an external microphone of the telematics terminal 120. The mobile terminal 110 includes PDA (Personal Digital Assistant), a cellular phone, a PCS (Personal Communication Service) phone, a GSM (Global System for Mobile) phone, a WCDMA (Wideband CDMA) phone, a CDMA (Code Division Multiple Access)-2000 phone or an MBMS (Multimedia Broadcast and Multicast Service) phone. And, the telematics terminal 120 provides a typical telematics service, and in particular, provides a mobile communication service through an embedded mobile communication module. That is, the telematics terminal 120 is assigned a separate phone number and provides a subscriber with a mobile communication service in the same way as the mobile terminal 110.

For terminal switching, the subscriber in the vehicle connects to the terminal switching server 170 using the telematics terminal 120, selects a desired mobile terminal 110 for terminal switching, and requests profile switching (i.e. terminal switching). At this time, the terminal switching server 170 provides the telematics terminal 120 with a list of a plurality of mobile terminals, and receives selection of any one mobile terminal among the list from the subscriber. For example, a family having one vehicle subscribes for a terminal switching service, sets the telematics terminal 120 as an object for terminal switching, and stores information of mobile terminals 110 of each member of the family. And, in the case that a member of the family gets in the vehicle and drives the vehicle, the driver connects to the terminal switching server 170 using the telematics terminal 120, selects his/her mobile terminal among the mobile terminal list of the family provided from the terminal switching server 170 and requests terminal switching.

And, in the case that the subscriber gets in the vehicle and starts the engine, an electronic control unit mounted in the vehicle may recognize a starting activation and transmit a terminal switching activation trigger signal to the telematics terminal 120, and the telematics terminal 120 may recognize the terminal switching activation trigger signal and request profile switching (i.e. terminal switching) to the terminal switching server 170.

Alternatively, the subscriber may request terminal switching to the terminal switching server 170 by directly inputting a telephone number of his/her mobile terminal 110 into the telematics terminal 120. This can be variously applied according to change in design by persons skilled in the art.

When the telematics terminal 120 requests terminal switching, the mobile terminal 110 is inactivated and the telematics terminal 120 is activated, so that the subscriber can use a mobile communication service by the telematics terminal 120, not by the mobile terminal 110.

The base transceiver station 130 (BSC/RNC) is connected with the mobile terminal 110 and the telematics terminal 120 wirelessly to control the mobile terminal 110 and the telematics terminal 120 and connect a traffic channel, and receives an outgoing call from the terminals 110 and 120 and transmits the outgoing call to a base station controller/radio network controller (BSC/RNC) (not shown). The base station controller/radio network controller controls the base transceiver station 130, and performs wireless channel assignment and release on the mobile terminal 110 and the telematics terminal 120, transmitter power control of the terminals 110 and 120 and the base transceiver station 130, determination of soft handoff and hard handoff between cells, transcoding and vocoding, or management and maintenance and repair of the base transceiver station 130

The mobile switching center 140 performs basic and additional service processing, processing of incoming and outgoing calls of a subscriber, location registration and handoff, or interworking with other network, i.e. a public network or an intelligent network system. In particular, when terminal switching is made, the mobile switching center 140 intercepts a call originated from the mobile terminal 110 and provides the telematics terminal 120 with a voice/video call or a data call destined for the mobile terminal 110. Preferably, after terminal switching, the mobile switching center 140 stores and manages an inactive information of the mobile terminal 110 to intercept a service of the mobile terminal 110, and stores an identification information (for example, MSISDN) of the mobile terminal 110 corresponding to IMSI (International Mobile Subscriber Identity) of the telematics terminal 120 and provides the telematics terminal 120 with a mobile communication service destined for the mobile terminal 110 using the identification information.

Meanwhile, the mobile switching center 140 intercepts all calls originated from the mobile terminal 110 after terminal switching, and may not intercept an outgoing call for a specific function. For example, when the subscriber uses the telematics terminal 120 after terminal switching, although the subscriber wants to release the terminal switching, call origination of the mobile terminal 110 is intercepted, so it is not possible to release terminal switching by the mobile terminal 110. Therefore, in the case that an outgoing call for terminal switching release is transmitted from the mobile terminal 110, the mobile switching center 140 allows origination of the corresponding call, so that terminal switching is released.

Preferably, the mobile switching center 140 stores and manages a function code information for terminal switching release, and when an outgoing call including the function code is transmitted from the mobile terminal 110, the mobile switching center 140 refers to the function code and allows origination of the corresponding outgoing call.

The mobile communication network 150 is connected with the mobile switching center 140, the home location register 160 and the terminal switching server 170, and provides interface and signaling between each network equipment. Preferably, the mobile communication network includes No. 7 network, and each network equipment operates while being connected to the No. 7 network.

The home location register (HLR) 160 is a database for storing a service profile about a subscriber information of the mobile terminal 110 and the telematics terminal 120, and stores and manages identification numbers (IMSI or MSISDN), additional information and location information of the mobile terminal 110 and the telematics terminal 120, and information necessary for terminal switching according to the present invention.

Preferably, the home location register 160 stores and manages location information of the mobile terminal 110 and the telematics terminal 120, and in the case that the subscriber requests to switch from the mobile terminal 110 to the telematics terminal 120, the home location register 160 inactivates information of the mobile terminal 110 and activates information of the telematics terminal 120, so that a mobile communication service (for example, a voice/video call or a data call) provided to the mobile terminal 110 is provided to the telematics terminal 120.

On the contrary, in the case of terminal switching release request from the subscriber, the home location register 160 activates information of the mobile terminal 110 and inactivates information of the telematics terminal 120, so that a mobile communication service (for example, a voice/video call or a data call) provided to the mobile terminal 110 is provided to the mobile terminal 110 as originally provided.

FIG. 3 is a view illustrating an example of a table stored in the home location register 160, and as shown in FIG. 3, the home location register 160 activates/inactivates a location information of the mobile terminal 110 used by the subscriber (that is, sets a terminal switching flag to '1' or '0'), according to terminal switching request of the subscriber. Specifically, in the case that the subscriber using the mobile terminal 110 of a telephone number [010-111-xxxx] requests terminal switching, the home location register 160 that stores a profile information of the mobile terminal 110 of the corresponding subscriber, inactivates a location information (RN1) of the mobile terminal 110 of the corresponding subscriber (sets a terminal switching flag to '0') and activates a location information of the telematics terminal 120 (sets a terminal switching flag to '1') by setting a location information (RN2) of the telematics terminal 120 to a location information of the mobile terminal 110. On the contrary, in the case of terminal switching release, the home location register 160 inactivates a location information (RN2) of the telematics terminal 120 (sets a terminal switching flag to '0') and activates a location information (RN1) of the mobile terminal 110 (sets a terminal switching flag to '1').

According to terminal switching request of the subscriber, the terminal switching server 170 provides terminal switching to the subscriber, and stores and manages information according to terminal switching. Preferably, when receiving a terminal switching request from the subscriber, the terminal switching server 170 inactivates information of the mobile terminal 110, and activates information of the telematics terminal 120 by the home location register 160. And, when receiving a terminal switching release request from the subscriber, the terminal switching server 170 activates information of the mobile terminal 110 and inactivates information of the telematics terminal 120 by the home location register 160.

Figure 2:
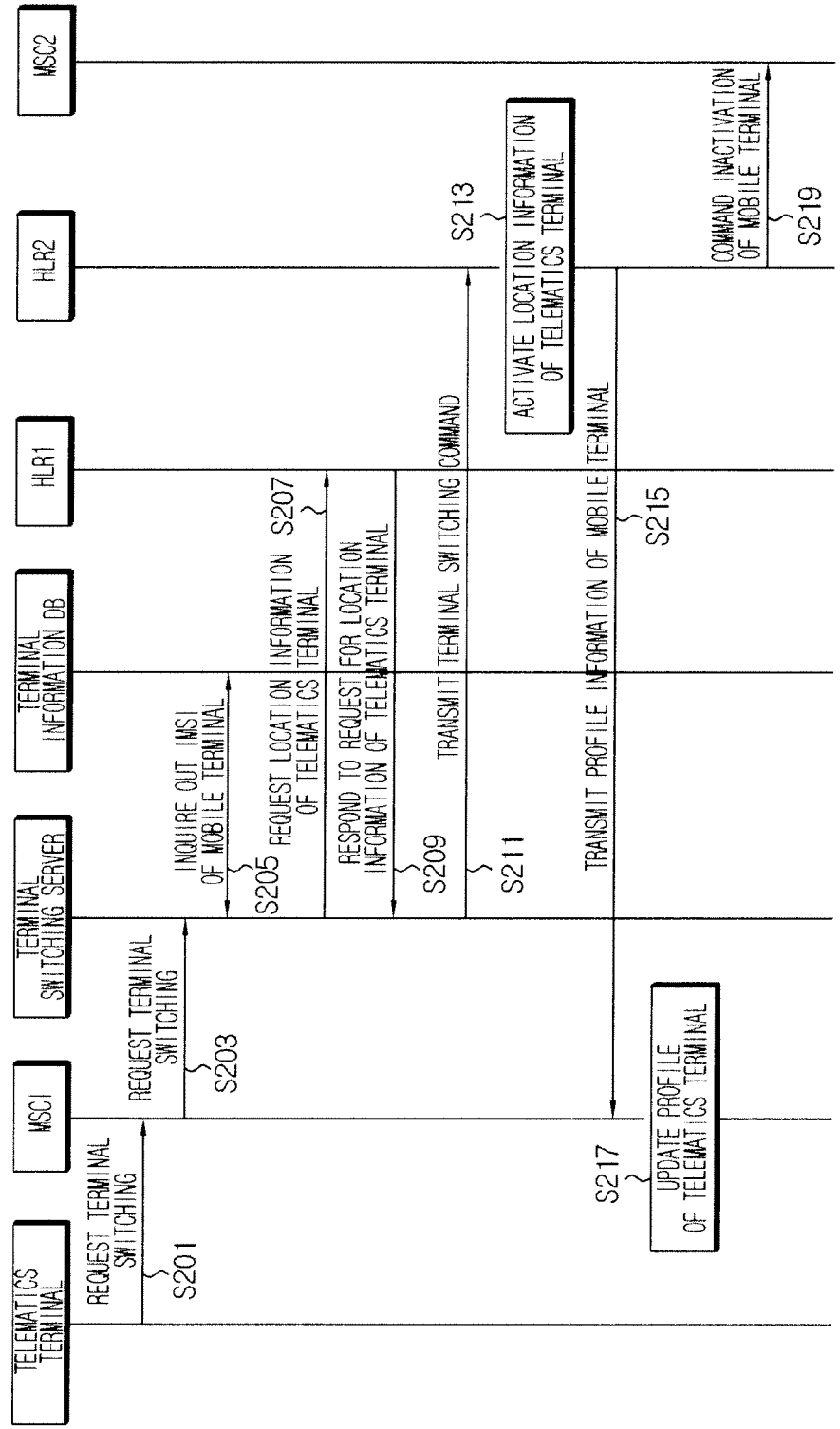
FIG. 2 is a flow chart illustrating a step for setting terminal switching in the terminal switching service system according to an embodiment of the present invention.

FIG. 2 is a flow chart illustrating a terminal switching step in the terminal switching service system according to an embodiment of the present invention.

As shown in FIG. 2, first, to switch from the mobile terminal 110 to the telematics terminal 120, a subscriber requests terminal switching to the terminal switching server 170 using the telematics terminal 120. In the case of terminal switching request using the telematics terminal 120, the telematics terminal 120 transmits to the mobile switching center 140 a terminal switching request signal including an identification information (for example, MSISDN) of the mobile terminal 110 and IMSI of the telematics terminal 120 via a wireless section (S201). That is, the telematics terminal 120 transmits to the mobile switching center 140 a terminal switching request signal including an identification information of the mobile terminal 110, received from the subscriber. Subsequently, the mobile switching center 140 transmits to the terminal switching server 170 the terminal switching request signal including the identification information of the mobile terminal 110 and the IMSI of the telematics terminal 120, received from the telematics terminal 120 (S203). At this time, preferably the mobile switching center 140 transmits the terminal switching request signal to the home location register 160, receives a routing information toward the terminal switching server 170 in response to the terminal switching request signal, and transmits to the terminal switching server 170 the terminal switching request signal including the identification information of the mobile terminal 110 and the IMSI of the telematics terminal 120.

Here, a subscriber certification step may be performed between the telematics terminal 120 and the terminal switching server 170. That is, the terminal switching server 170 requires the telematics terminal 120 to input a password, and compares the inputted password with a terminal switching service subscriber information to perform subscriber certification.

The terminal switching server 170 receives the terminal switching request signal as mentioned above, and inquires out IMSI of the corresponding mobile terminal 110 in a terminal information DB (S205). That is, the terminal switching server 170 inquires out IMSI of the mobile terminal 110 in the terminal information DB using the identification information (for example, MSISDN) of the mobile terminal 110 included in the terminal switching request signal.

Next, the terminal switching server 170 requests a location information of the telematics terminal 120 (for example, the mobile switching center (MSC1 of FIG. 2) 140 information) to the home location register (HLR1 of FIG. 2) 160 that stores a profile information of the telematics terminal 120, and receives a response to the request (S207 and S209). That is, the terminal switching server 170 transmits the IMSI of the telematics terminal 120 to the home location register (HLR1) 160 and receives a routing information of the mobile switching center (MSC1) 140 in response to the request.

Subsequently, the terminal switching server 170 transmits a terminal switching command including the location information (for example, the mobile switching center (MSC1 of FIG. 2) 160 information) of the telematics terminal 120 to the home location register (HLR2 of FIG. 2) 160 that stores a profile information of the mobile terminal 110 (S211).

The home location register (HLR2) 160 that stores a profile information of the mobile terminal 110 receives the terminal switching command from the terminal switching server 170, inactivates a location information of the mobile terminal 110 stored and managed therein, and sets and activates the location information of the telematics terminal 120 included in the terminal switching command (S213). That is, not an actual location information of the mobile terminal 110, but the location information of the telematics terminal 120 is set as a location information of the mobile terminal 110 in the home location register (HLR2) 160 that stores a profile information of the mobile terminal 110, so that a service signal destined for the mobile terminal 110 is transmitted to the telematics terminal 120.

Next, the home location register (HLR2) 160 that stores a profile information of the mobile terminal 110 transmits the profile information of the mobile terminal 110 to the mobile switching center (MSC1) 140 where the telematics terminal 120 exists (S215). The mobile switching center (MSC1) 140, where the telematics terminal 120 exists, receives the profile information of the mobile terminal 110, and changes the profile information of the telematics terminal 120 into the received profile information of the mobile terminal 110 (S217). That is, the mobile switching center (MSC1) 140, where the telematics terminal 120 exists, maps an identification information (for example, MSISDN) of the mobile terminal 110 to IMSI of the telematics terminal 120, and stores and manages the mapping information. Preferably, the information of the telematics terminal 120 is stored and managed in a visitor location register (VLR).

A call destined for the mobile terminal 110 is transmitted to the mobile switching center (MSC1) 140, where the telematics terminal 120 exists, by the home location register (HLR2) 160 that stores a profile information of the mobile terminal 110. The mobile switching center (MSC1) 140 searches for IMSI of the telematics terminal 120 in the mapping information using a called party information (for example, MSISDN of the mobile terminal 110) of the transmitted call, detects the telematics terminal 120 using the searched IMSI, and transmits to the telematics terminal 120 an incoming call to be transmitted to the mobile terminal 110. Thus, the subscriber can be provided with a service destined for the mobile terminal 110 using the telematics terminal 120, not using the mobile terminal 110.

Meanwhile, the home location register (HLR2) 160 that stores a profile information of the mobile terminal 110 transmits a mobile terminal inactivation command to the mobile switching center (MSC2 of FIG. 2) 140, where the mobile terminal 110 exists (S219). According to the inactivation command, the mobile switching center (MSC2) 140 intercepts a service destined for the mobile terminal 110 and intercepts a call originated from the mobile terminal 110, so that the subscriber can not use a service by the mobile terminal 110.

As mentioned above, according to the terminal switching method of the present invention, the subscriber can be provided with a service destined for the mobile terminal 110 through the telematics terminal 120, instead of the mobile terminal 110. Therefore, when the subscriber gets in a vehicle, the subscriber receives a mobile communication service of the mobile terminal 110 by the telematics terminal 120, and thus the subscriber can drive the vehicle safely.

Figure 4:
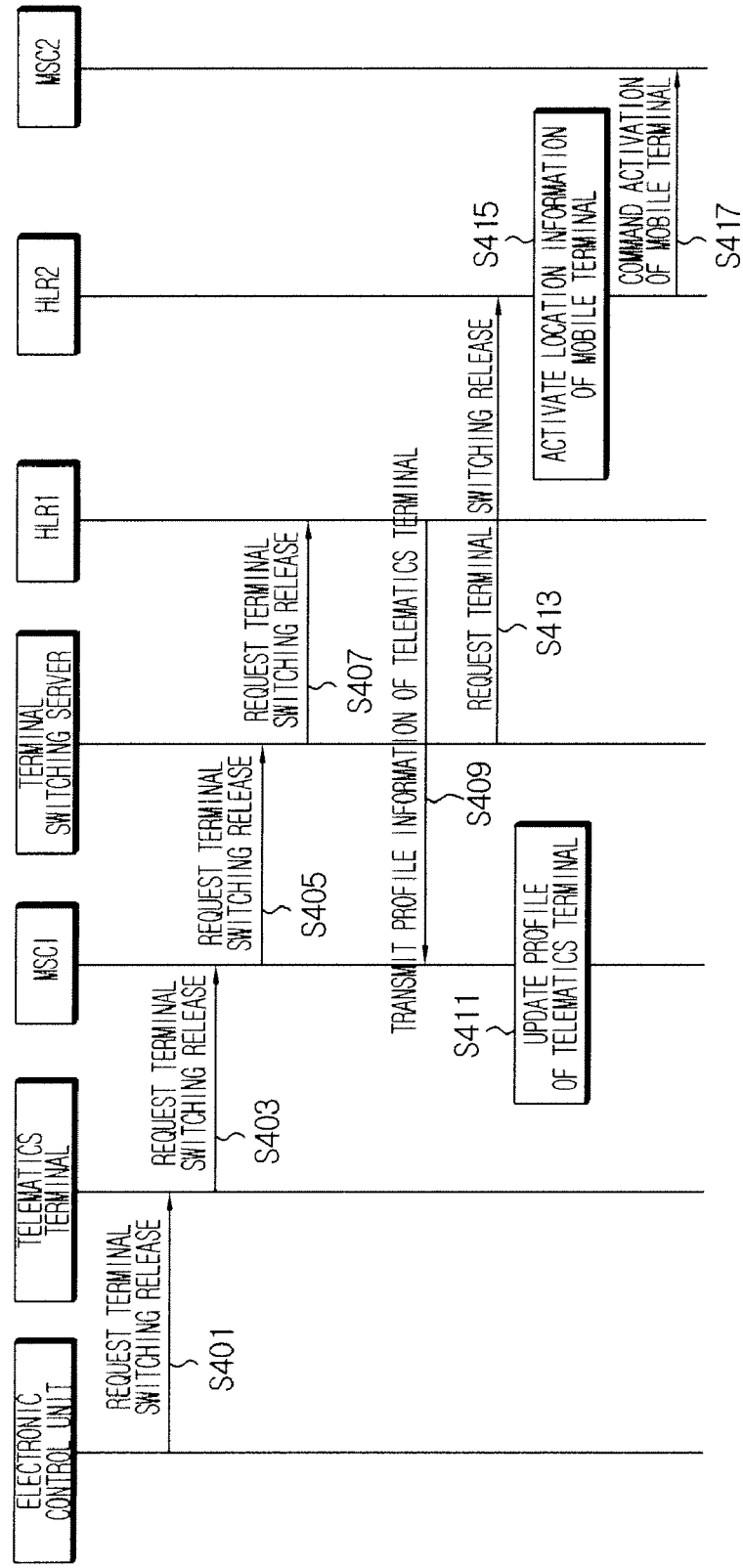
FIG. 4 is a flow chart illustrating a step for releasing terminal switching according to an embodiment of the present invention.

FIG. 4 is a flow chart illustrating a step for releasing terminal switching according to an embodiment of the present invention.

As shown in FIG. 4, first, an electronic control unit mounted in a vehicle senses that a subscriber is not in a driving state, for example stop of a vehicle during driving, trouble in the engine or stop of starting, and requests terminal switching release to the telematics terminal 120 (S401). That is, when the subscriber is not in a driving state, the subscriber releases terminal switching to the telematics terminal 120 to use the mobile terminal 110 again. And, for privacy protection of the subscriber, i.e. to prevent another passenger from listening to a telephone conversion, in the case that there is another passenger in the vehicle, the electronic control unit may sense another passenger and request terminal switching release to the telematics terminal 120. That is, when the electronic control unit senses a predetermined weight upon a passenger seat other than a driver's seat of the vehicle, the electronic control unit may request terminal switching release to the telematics terminal 120. And, the sensing of another passenger may be made by proximity reading using RFID (Radio Frequency IDentification) of the telematics terminal 120. That is, if the terminal-switched telematics terminal 120 senses a signal (that is, RFID) of a mobile terminal of a passenger other than the driver's mobile terminal 110, the telematics terminal 120 may request terminal switching release to the terminal switching server 170.

Preferably, terminal switching restoration according to a specific state of the subscriber's vehicle is made by the subscriber's setting. That is, in the case that the subscriber in a stopped state during driving does not set terminal switching restoration through setting of the telematics terminal 120, the subscriber can continuously use a mobile communication service by the telematics terminal 120.

The telematics terminal 120 receives the terminal switching release request from the electronic control unit, and requests terminal switching release to the terminal switching server 170. When the telematics terminal 120 requests terminal switching release to the terminal switching server 170, the telematics terminal 120 transmits to the mobile switching center (MSC1 of FIG. 4) 140 a terminal switching release request signal including IMSI and an identification information (for example, MSISDN) of the telematics terminal 120 via a wireless section (S403). Subsequently, the mobile switching center 140 transmits to the terminal switching server 170 the terminal switching release request signal received from the telematics terminal 120 (S405). At this time, preferably the mobile switching center 140 transmits the terminal switching release request signal to the home location register 160, receives a routing information toward the terminal switching server 170 in response to the release request signal, and transmits the terminal switching release request signal to the terminal switching server 170.

The terminal switching server 170 receives the terminal switching release request signal, and may perform subscriber certification with the telematics terminal 120. That is, the terminal switching server 170 may require the telematics terminal 120 to input a password, compare the inputted password with a terminal switching service subscriber information to perform subscriber certification, and perform terminal switching restoration.

Next, the terminal switching server 170 transmits the terminal switching release request signal to the home location register (HLR1 of FIG. 4) 160 that stores a profile information of the telematics terminal 120 (S407). Then, the home location register (HLR1) 160 that stores a profile information of the telematics terminal 120 transmits the profile information of the telematics terminal 120 to the mobile switching center (MSC1) 140 where the telematics terminal 120 exists (S409).

The mobile switching center (MSC1) 140, where the telematics terminal 120 exists, receives the profile information of the telematics terminal 120, and restores a profile information of the telematics terminal 120 stored therein using the received profile information of the telematics terminal 120 (S411). That is, the mobile switching center (MSC1) 140, where the telematics terminal 120 exists, mapped an identification information (for example, MSISDN) of the mobile terminal 110 to IMSI of the telematics terminal 120 in a profile information of the terminal-switched telematics terminal 120, and stored and managed the mapping information. However, according to terminal switching release of the subscriber, the mobile switching center (MSC1) 140 restores the identification information of the mobile terminal 110 mapped to the IMSI of the telematics terminal 120 to an identification information of the telematics terminal 120.

Meanwhile, the terminal switching server 170 transmits the terminal switching release request signal to the home location register (HLR2) 160 that stores a profile information of the mobile terminal 110 (S413). That is, the terminal switching server 170 extracts information of the mobile terminal 110 of the subscriber using a terminal switching service subscriber information and information of the telematics terminal 120 stored and managed therein, and transmits the terminal switching release request signal to the home location register (HLR2) 160 that stores a profile information of the mobile terminal 110 based on the extracted information.

The home location register (HLR2) 160 that stores a profile information of the mobile terminal 110 receives the terminal switching release request signal from the terminal switching server 170, activates a location information of the mobile terminal 110 stored and managed therein, and inactivates a location information of the telematics terminal 120 (S415). That is, not an actual location information of the mobile terminal 110, but the location information of the telematics terminal 120 was set as a location information of the mobile terminal 110 in the home location register (HLR2) 160 that stores a profile information of the mobile terminal 110, but the location information of the mobile terminal 110 is restored to an actual location information of the mobile terminal 110. Thus, a service signal destined for the mobile terminal 110 can be normally transmitted to the mobile terminal 110.

Meanwhile, the home location register (HLR2) 160 that stores a profile information of the mobile terminal 110 transmits a mobile terminal activation command to the mobile switching center (MSC2 of FIG. 4) 140 where the mobile terminal 110 is located (S417). Thus, the mobile switching center (MSC2) 140 transmits to the mobile terminal 110 a service destined for the mobile terminal 110, and accepts a call originated from the mobile terminal 110 to provide an original service.

As mentioned above, in the case of a specific situation, for example trouble in the engine, stop of a vehicle or existence of another passenger, the electronic control unit senses the specific situation and transmits a terminal switching restoration trigger signal to the telematics terminal 120, so that terminal switching is automatically restored to the mobile terminal 110.

Meanwhile, the subscriber may request terminal switching release to the terminal switching server 170 by inputting a separate function code and a phone number of the telematics terminal 120 into the mobile terminal 110. For example, the subscriber may request terminal switching release to the terminal switching server 170 by inputting [a specific number for terminal switching release service+a phone number of the telematics terminal 120+connection]. That is, in the case that the subscriber does not restore the terminal-switched telematics terminal 120 to the mobile terminal 110 and gets off the vehicle, the subscriber may request terminal switching release to the terminal switching server 170 using the mobile terminal 110, instead of the telematics terminal 120**.

In the above-mentioned embodiment, the telematics terminal 120 transmits a terminal switching setting request/terminal switching release request through a voice/video traffic channel, and the terminal switching setting signal/the terminal switching release request signal is transmitted to the mobile switching center 140. And, an activation or inactivation information of the mobile terminal 110 is set in the mobile switching center 140, and thus the mobile switching center 140 accepts or intercepts a channel switching signal destined for the mobile terminal 110. And, the profile information of the mobile terminal 110 is stored in the mobile switching center 140 as a profile information of the telematics terminal 120, and thus the mobile switching center 140 transmits to the telematics terminal 120 a circuit switching signal transmitted to the mobile terminal 110. However, the present invention is not limited in this regard, and the present invention may be applied to a packet switching signal in the same way. That is, the telematics terminal 120 may set or release terminal switching through a packet switching network. In this case, a terminal switching setting signal/terminal switching release request signal is transmitted to SGSN (Serving GPRS Support Node) that provides a packet service, consequently to the terminal switching server 170, and in the same way as the mobile switching center 140, an activation/inactivation information of the mobile terminal 110 may be set in the SGSN and a profile information of the telematics terminal 120 may be set in the SGSN. Thus, the SGSN intercepts or accepts a packet service provided to the mobile terminal 110, so that the packet service provided to the mobile terminal 110 is provided to the telematics terminal 120.

Figure 5:
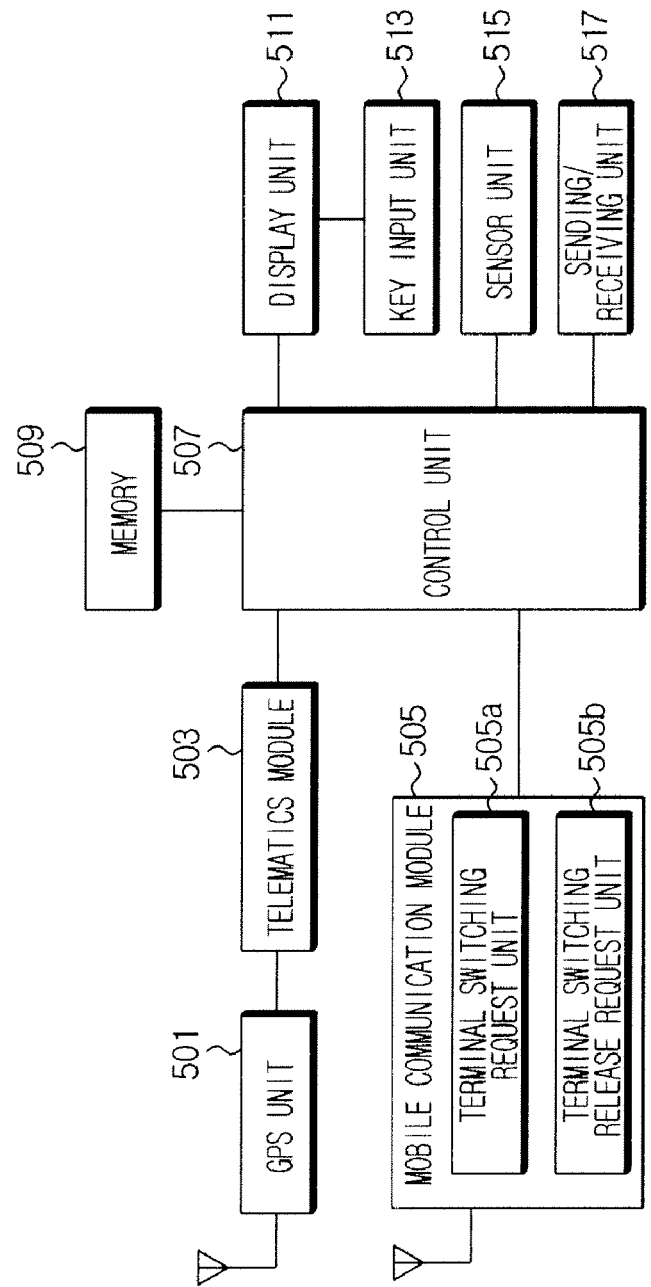
FIG. 5 is a view illustrating a configuration of a telematics terminal according to an embodiment of the present invention.

FIG. 5 is a view illustrating a configuration of a telematics terminal according to an embodiment of the present invention.

Referring to FIG. 5, a GPS unit 501 continuously communicates with a GPS satellite and transmits a received GPS signal to a telematics module 503. Then, the telematics module 503 checks a location information of a vehicle at the current point of time based on the GPS signal, computes a moving direction and a moving speed of the vehicle, and transmits to a control unit 507 a location information according to movement of the vehicle.

A mobile communication module 505 provides a general communication function of the mobile terminal 110. In particular, the mobile communication module 505 includes a terminal switching request unit 505*a* and a terminal switching release request unit 505*b*, and performs terminal switching/terminal switching release between the telematics terminal 120 and the mobile terminal 110. That is, the mobile communication module 505 requests terminal switching or terminal switching release to the terminal switching server 170 according to signal received from the control unit 509.

The control unit 507 receives the location information of the vehicle from the telematics module 503, extracts a map information corresponding to the location information from a memory 509, and displays the map and location information of the vehicle on a display unit 511. And, the control unit 507 receives a key information inputted by the subscriber from a key input unit 513 and processes the key information. And, the control unit 507 receives a specific key information representing a terminal switching (or terminal switching release) command from the key input unit 513 and transmits a terminal switching (or terminal switching release) signal to the mobile communication module 505.

And, the control unit 507 receives the terminal switching signal or terminal switching release signal from a sensor unit 515 and transmits the terminal switching signal or terminal switching release signal to the mobile communication module 505. That is, when the control unit 507 receives a starting activation signal from the sensor unit 515, the control unit 507 transmits the terminal switching signal to the mobile communication module 505. And, when the control unit 507 receives from the sensor unit 515 a sensor signal of stop of a vehicle during driving, trouble in the engine, stop of starting or existence of another passenger, the control unit 507 transmits the terminal switching release signal to the mobile communication module 505.

The memory 509 includes EEPROM (Electrically Erasable and Programmable Read Only Memory) or a flash memory, and stores various information including a map information, location of a vehicle, or RFID (Radio Frequency IDentification) or a telephone directory of the mobile terminal 110 of the subscriber.

The display unit 511 has typically an LCD (Liquid Crystal Display), and displays various information by control of the control unit 507. The key input unit 513 includes various keys, for example a number key, a connection key or a menu key, and transmits to the control unit 517 a key information inputted by the subscriber. The key input unit 513 may be incorporated as a touch pad, and included in the display unit 511.

The sensor unit 515 is connected to the electronic control unit mounted in the vehicle, and checks the state of the vehicle. The sensor unit 515 senses an overall signal of the vehicle, for example activation of starting, stop of the vehicle during driving, trouble in the engine or stop of starting, and transmits the signal to the control unit 507. And, when the sensor unit 515 senses a predetermined weight on a passenger seat other than a driver's seat, the sensor unit 515 transmits a sensor signal to the control unit 507. Further, when the sensor unit 515 senses a mobile terminal other than the driver's mobile terminal 110, the sensor unit 515 may transmit a sensor signal to the control unit 507. The sensing of another passenger is made by proximity reading using RFID.

A sending/receiving unit 517 receives a decoded PCM signal from the control unit 507, and converts the decoded PCM signal into an analog signal, so that the subscriber can hear the signal. And, the sending/receiving unit 517 receives an input analog voice signal from the subscriber and transmits the analog voice signal to the control unit 509. The sending/receiving unit 517 may be connected to an external speaker and an external microphone of the vehicle.

The above-mentioned present invention may be incorporated as a computer readable code in a computer readable medium. The computer readable medium includes all kinds of storage devices for storing data readable by a computer system. For example, the computer readable medium is CD-ROM (Compact Disc Read Only Memory), RAM (Random Access Memory), ROM (Read Only Memory), a floppy disc, a hard disc or a magneto-optical disc. The above-mentioned process is well known to ordinary persons skilled in the art, and its detailed description is omitted.

As such, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

The present invention facilitates terminal switching between a telematics terminal and a mobile terminal and automatically switches from the telematics terminal to the mobile terminal depending on another passenger to prevent another passenger from listening to a telephone conversation of a subscriber, thereby protecting privacy of the subscriber.

The invention claimed is:

1. A method for providing a switching service between a telematics terminal and a mobile terminal, the method comprising:
   a switching step for receiving a terminal switching request from the telematics terminal mounted in a vehicle on a mobile communication network and providing the telematics terminal with a mobile communication service to be provided to the mobile terminal;
   a restoration request receiving step for receiving a terminal switching restoration request from the telematics terminal that sensed another passenger in the vehicle on the mobile communication network; and
   a restoring step for restoring information of each terminal to a state before terminal switching on the mobile communication network according to the restoration request.

2. The method for providing a switching service between a telematics terminal and a mobile terminal according to claim 1,
   wherein the restoration request receiving step includes:
   recognizing another passenger by an electronic control unit mounted in the vehicle and generating a terminal switching restoration trigger signal; and
   receiving a terminal switching restoration request from the telematics terminal that received the terminal switching restoration trigger signal.

3. The method for providing a switching service between a telematics terminal and a mobile terminal according to claim 2,
   wherein the electronic control unit recognizes another passenger based on weight of a seat of the vehicle.

4. The method for providing a switching service between a telematics terminal and a mobile terminal according to any one of claims 1 to 3,
   wherein the switching step includes:
   activating a location information of the telematics terminal by setting a location information of the telematics terminal as a location information of the mobile terminal in a home location register; and
   changing a profile information of the telematics terminal stored in a mobile switching center into a profile information of the mobile terminal.

5. A system for providing a switching service between a telematics terminal and a mobile terminal, which releases terminal switching from the mobile terminal to the telematics terminal mounted in a vehicle on a mobile communication network, the system comprising:
   a terminal switching service device for receiving a terminal switching release request from the telematics terminal that sensed another passenger in the vehicle;
   a first home location register for restoring an information of the mobile terminal by inactivating an information of the telematics terminal set as an information of the mobile terminal and activating the information of the mobile terminal, according to command of the terminal switching service device;
   a first switching device for receiving a mobile terminal activation command from the first home location register to release interception of a mobile communication service of the mobile terminal; and a second switching device for restoring a profile information of the mobile terminal set as a profile information of the telematics terminal to the profile information of the telematics terminal, with the telematics terminal being in a service area.

6. The system for providing a switching service between a telematics terminal and a mobile terminal according to claim 5, further comprising:

an electronic control unit installed in the vehicle and configured to recognize another passenger based on weight of a seat other than a driver's seat and transmit to the telematics terminal a terminal switching restoration trigger signal according to recognition of another passenger.

7. A telematics terminal switched from/to a mobile terminal, comprising:

a mobile communication module for requesting terminal switching and terminal switching release between the mobile terminal and the telematics terminal to a terminal switching server;

a sensor unit for sensing another passenger other than a driver; and a control unit for, when receiving another passenger recognition signal from the sensor unit, transmitting a terminal switching release command to the mobile terminal.

8. The telematics terminal according to claim 7, wherein the sensor unit senses another passenger by sensing weight of a seat other than a driver's seat in the vehicle.

* * * * *